A. T. PALMER.
RAIL JOINT.
APPLICATION FILED NOV. 30, 1917.
1,281,823.　　　　　　　　　　　　Patented Oct. 15, 1918.
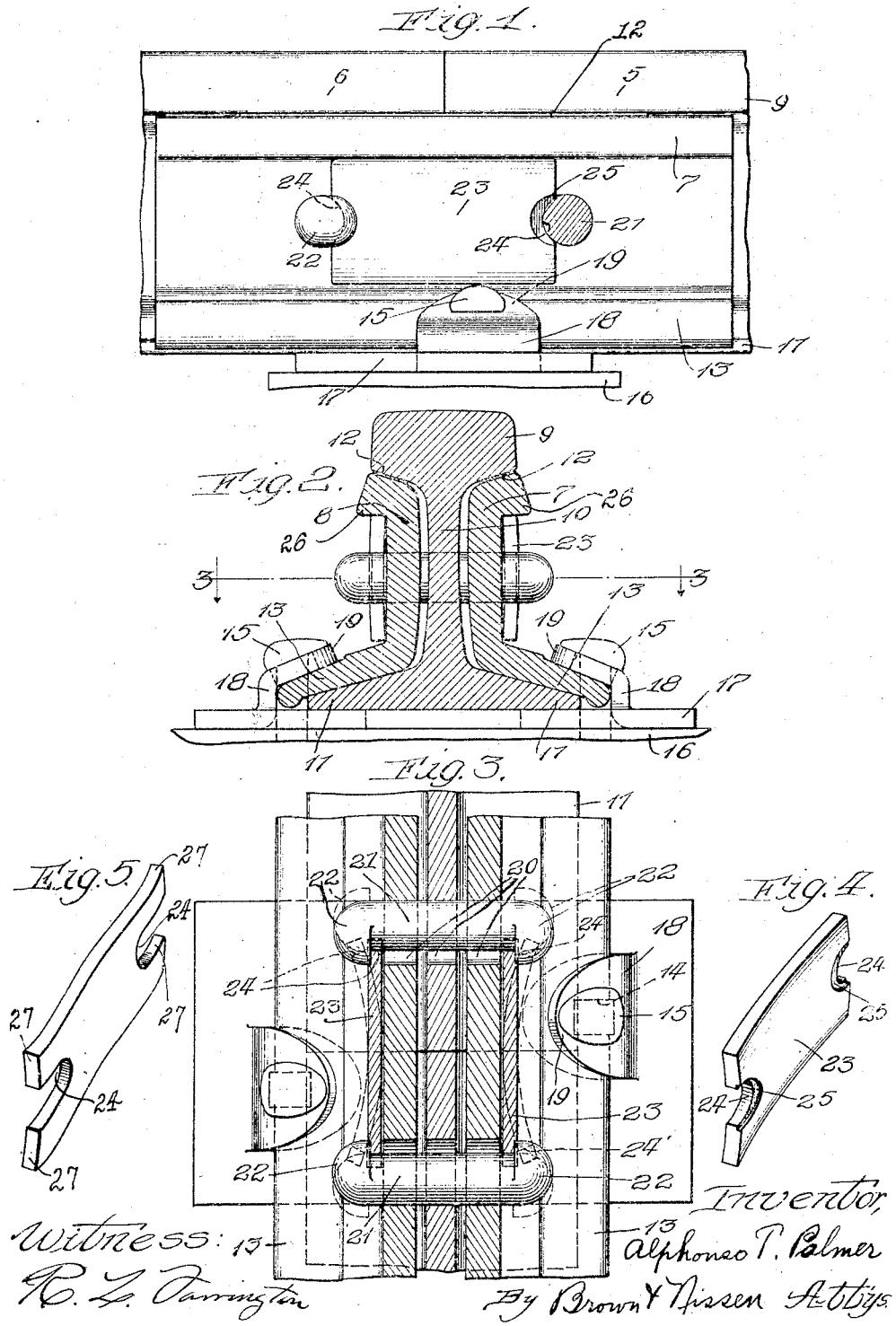
Witness:
R. L. Carrington
Inventor,
Alphonso T. Palmer
By Brown & Nissen Attys.

UNITED STATES PATENT OFFICE.

ALPHONSO T. PALMER, OF CHICAGO, ILLINOIS.

RAIL-JOINT.

1,281,823.   Specification of Letters Patent.   Patented Oct. 15, 1918.

Application filed November 30, 1917. Serial No. 204,579.

*To all whom it may concern:*

Be it known that I, ALPHONSO T. PALMER, a citizen of the United States, residing at Chicago, in the county of Cook and State of Illinois, have invented certain new and useful Improvements in Rail-Joints, of which the following is a specification.

My invention relates to rail joints, and has for one of its objects the provision of simple and efficient means for connecting adjacent ends of railway rails.

A further object is the provision of bolts having integrally formed heads, and means for quickly and easily adjusting the bolts into and out of operative condition.

A still further object is the provision of means on the fish plates for protecting parts of the joint from accidents in cases of derailments of trains passing over the joint.

Other objects will appear hereinafter.

One form of my invention is shown in the accompanying drawing, forming a part of this specification, and in which—

Figure 1 is a side elevation of a joint embodying my invention.

Fig. 2 is a transverse section of the same.

Fig. 3 is a view taken on line 3—3 of Fig. 2.

Fig. 4 is a view, in perspective, showing a spring used in the construction; and Fig. 5 shows a modified form of spring construction.

My invention is adaptable for embodiment in rail joints where the rails are in abutting relation.

Referring more particularly to the drawing, I have shown two rail ends 5 and 6 in abutting relation with fish plates 7 and 8 on the opposite sides of the rail ends. Each of the rail ends is provided with the usual heads 9, webs 10, and flanges 11. The fish plates 7 and 8 are arranged so that the upper edges are adapted to engage the under sides of the heads 9 or thin plates 12, which may be inserted between the heads 9 and fish plates 7 and 8. The lower edges of the fish plates are adapted to rest on the upper sides of the flanges 11. I also preferably provide edge portions 13 on the fish plates 7 and 8 which extend over the top edges of the flanges 11. The edge portions 13 are preferably provided with notches 14 for spikes 15 to be fitted into. This arrangement permits the spikes 15 to be driven into a tie 16 at the edges of the flanges 11, and also engaging the bottoms of the notches 14, thereby tending to hold the rail ends and fish plates in operative position, even though the bolts passing through the fish plates and rail ends were to become inoperative, and until such bolts could be replaced with perfect ones.

As a further means for holding the rail joint in operative condition, I have provided a chair or plate 17 under the joint, between the rail ends 5 and 6. This plate 17 is provided with portions 18 struck up in a manner to engage the edge portions of the parts 13 of the fish plates. This also tends to hold the fish plates against spreading. In some instances it may be desirable to extend the struck up portions 18 across on the tops of the parts 13 of the fish plates providing ears 19, which may be perforated, and the spikes 15 passed through such perforations. This arrangement facilitates holding the joint very rigid, since the spikes passing down through the ear parts 19 hold the latter tightly on the parts 13 of the fish plates.

Through the fish plates and rail ends, I provide openings 20 which are preferably shaped obrotund, and may have any desired non-round cross-section. The bolts 21 passing through the fish plates and rail ends are preferably round in cross-section with L-shaped integral heads 22. The size and shape of the holes 20 are preferably formed to permit the heads 22 to pass through them. On the remote sides of the fish plates 7 and 8, I provide spring members 23 which engage the fish plates and the under sides of the bolt heads 22 to lock the joint in operative condition. The spring members 23 are preferably substantially rectangular with notches 24 in their ends adapted to engage the bolts 21, and on the outer sides of the springs 23, I preferably provide recesses 25, so that when the springs are sprung down against the fish plates to permit turning the bolts 21 from their dotted line positions, indicated in Fig. 3, to the full line positions of this figure, the recesses 25 will engage the under sides of the heads 22 and hold the bolts against rotation in the holes 20 upon releasing the spring. With this arrangement when the bolts are pressed in operative condition, as illustrated particularly in Fig. 3, the spring members press outwardly on the bolt heads and inwardly on the fish plates, thereby holding the joint very firmly, yet permitting sufficient resiliency to make a long wearing effective joint.

The springs 23 are preferably formed in the shape shown in Fig. 4 having a curve extending longitudinally thereof, and a second curve extending laterally thereof, so that in flexing the spring both of these curves are lessened, thereby providing a spring construction which has a maximum power of resisting flexing movements for the material used therein. This particular spring construction enables the use of substantially thin material, and yet one which is sufficiently strong to maintain the joint in operative condition. With a construction of this kind there are no nuts to tighten, and the springs have sufficient flexibility to accommodate shrinkages and expansions due to heat and cold, and also to take up wear in the joint.

Between the under sides of the heads 9 and the top edges of the fish plates 7 and 8, I preferably provide thin plates 12 which may be of metal having more or less hardness according to the purpose for which the rail joint is used. In this construction I preferably provide the plates 12 considerably shorter than the lengths of the fish plates, as clearly indicated in Fig. 1.

By making the plates 12 short, as mentioned, the pressure between said plates and the lower sides of the rail heads 9 is increased per square inch over what it would be if said plates were as long as the fish plates. In rail joints where the plates 12 are formed as long as the fish plates the corners of the heads where the rails come together cut into the surfaces below them. In applicant's construction the heads 9 are held normally by concentrating the pressure thereon to a small area thereby holding the heads so tight that the wear is reduced to a minimum.

In a joint of the kind mentioned I preferably make the joint between the rail ends 5 and 6 on top of a tie in order to give the joint great firmness. Also I prefer to use only two bolts, one passing through each of the rail ends, as clearly indicated in Figs. 1 and 3.

Along the upper edges of the fish plates 7 and 8, I preferably provide extensions 26 which extend over the springs and parts of the bolt heads in order to protect these parts in case a train should become derailed and pass along close to the rail joint. These extensions would simply act as means for keeping the wheels of a train away from the spring and bolt heads, thereby preventing injury to the joint.

In Fig. 5 I have shown a slightly modified form of spring construction. The spring shown in this figure is curved both laterally and longitudinally the same as that shown in Fig. 4, and in addition thereto has extensions on the notched ends forming deeper notches 24 and having these end portions curved backwardly. In assembling this form of spring in the joint, the ends 27 are adapted to engage the sides of the fish plates and increase the strength of the springs. That is, in addition to the strength of the spring shown in Fig. 4, these end portions 27 add strength to this form of spring.

While I have illustrated and described the preferred form of my invention, I do not desire to be limited to the precise details set forth, but desire to avail myself of such variations and changes as come within the scope of the appended claims.

I claim:—

1. A rail joint comprising a pair of rail ends having the usual heads, webs and flanges; fish plates on the opposite sides of the rail ends, there being registering holes in the fish plates and rail ends; springs on the remote sides of the fish plates with recesses on the outer sides of the springs; bolts in said holes; and heads formed integral with the bolts and disposed in said recesses holding the bolts against rotation and coöperating with such bolts to hold the rail joint in operative condition.

2. A rail joint comprising a pair of rail ends having the usual heads, webs and flanges; fish plates on the opposite sides of the rail ends, there being registering holes in the fish plates and rail ends; springs on the remote sides of the fish plates with notches in the ends thereof and recesses in their outer sides adjacent said notches; bolts in the holes and notches; and heads formed integral with the bolts disposed in said recesses holding the bolts against rotation in said holes and notches.

3. A rail joint comprising a pair of rail ends having the usual heads, webs and flanges; fish plates on opposite sides of the rail ends, there being registering holes in the rail ends and fish plates; bolts extending through said holes; substantially L-shaped heads on the bolts and being of substantially the same size and shape in cross-section as the size and shape of said holes in cross-section; and springs on the remote sides of the fish plates extending across the parts of said openings not filled by the bolts and engaging said bolt heads.

4. A rail joint comprising a pair of rail ends having the usual heads, webs and flanges; fish plates on opposite sides of the rail ends, there being registering openings through the rail ends and fish plates; bolts having integral L-shaped heads thereon adapted to pass through said openings; and members engaging the fish plates, bolts and heads and having recesses therein engaging said heads for holding the bolts against rotation.

5. A rail joint spring comprising spring material curved both laterally and longitudinally throughout its width and length.

6. A rail joint comprising spring material in substantially rectangular form and curved laterally and longitudinally throughout its width and length and having bolt-engaging notches in its ends.

7. A rail joint comprising rail ends having the usual heads, webs and flanges; fish plates on the opposite sides of the rail ends; bolts extending through the rail ends and fish plates; substantially rectangular springs on the remote sides of the fish plates curved longitudinally away from the latter with their ends engaging the bolt heads and curved laterally toward the fish plates with the central portions of its lateral edges in close contact with the fish plates.

8. A rail joint comprising rail ends having the usual heads, webs and flanges; fish plates on the opposite sides of the rail ends; bolts extending through the rail ends and fish plates; springs under the bolt heads on the remote sides of the fish plates; and thin plates between the top edges of the fish plates and the under sides of the rail heads, said thin plates being considerably shorter than the lengths of the upper edges of the fish plates.

9. A rail joint comprising rail ends having the usual heads, webs and flanges; fish plates on the opposite sides of the rail ends and having edge portions extending over the flanges of the rail ends with spike notches in said edge portions; bolts extending through the rail ends and fish plates; and a chair under the rail joint having portions struck up and engaging said edge portions of the fish plates adapted to hold the fish plates against movement away from each other should the bolt become ineffective.

10. A rail joint spring comprising a sheet of material substantially rectangular having notches extending longitudinally into its ends, and curved both laterally and longitudinally with the end portions adjacent said notches curved in the opposite direction to the central portion of the spring.

In testimony whereof I have signed my name to this specification, on this 26th day of November, A. D. 1917.

ALPHONSO T. PALMER.

Copies of this patent may be obtained for five cents each, by addressing the "Commissioner of Patents, Washington, D. C."